US011157405B2

(12) United States Patent
Rustad et al.

(10) Patent No.: US 11,157,405 B2
(45) Date of Patent: Oct. 26, 2021

(54) PROGRAMMABLE CACHE COHERENT NODE CONTROLLER

(71) Applicant: NUMASCALE AS, Oslo (NO)

(72) Inventors: Einar Rustad, Oslo (NO); Helge Simonsen, Oslo (NO); Steffen Persvold, Oslo (NO); Goutam Debnath, Beaverton, OR (US); Thomas Moen, Oslo (NO)

(73) Assignee: NUMASCALE AS, Oslo (NO)

( * ) Notice: Subject to any disclaimer, the term of this patent is extended or adjusted under 35 U.S.C. 154(b) by 0 days.

(21) Appl. No.: 16/342,651

(22) PCT Filed: Oct. 16, 2017

(86) PCT No.: PCT/NO2017/050266
§ 371 (c)(1),
(2) Date: Apr. 17, 2019

(87) PCT Pub. No.: WO2018/074933
PCT Pub. Date: Apr. 26, 2018

(65) Prior Publication Data
US 2020/0050547 A1 Feb. 13, 2020

(30) Foreign Application Priority Data
Oct. 18, 2016 (NO) .................................. 20161654

(51) Int. Cl.
*G06F 12/00* (2006.01)
*G06F 12/0813* (2016.01)
(Continued)

(52) U.S. Cl.
CPC ...... *G06F 12/0813* (2013.01); *G06F 12/0811* (2013.01); *G06F 12/0826* (2013.01);
(Continued)

(58) Field of Classification Search
CPC .................. G06F 12/0826; G06F 12/0813
See application file for complete search history.

(56) References Cited

U.S. PATENT DOCUMENTS 6,094,686 A 7/2000 Sharma
6,789,173 B1 9/2004 Tanaka et al.
(Continued)

FOREIGN PATENT DOCUMENTS

WO 2016144953 A1 9/2016

OTHER PUBLICATIONS

Teodosiu D et al: "Hardware Fault Containment in Scalable Shared-memory Multiprocessors", Jun. 2, 1997; Jun. 2, 1997-Jun. 4, 1997, Jun. 2, 1997 (Jun. 2, 1997), pp. 73-84, XP010234341.
(Continued)

*Primary Examiner* — Baboucarr Faal
(74) *Attorney, Agent, or Firm* — Robert P. Michal, Esq.; Carter, DeLuca & Farrell LLP

(57) ABSTRACT

A computer system includes a first group of CPU modules operatively coupled to at least one first Programmable ASIC Node Controller configured to execute transactions directly or through a first interconnect switch to at least one second Programmable ASIC Node Controller connected to a second group of CPU modules running a single instance of an operating system.

17 Claims, 7 Drawing Sheets

(51) Int. Cl.
*G06F 12/0811* (2016.01)
*G06F 12/0817* (2016.01)
*G06F 12/0831* (2016.01)
*G06F 12/0895* (2016.01)
*G06F 15/80* (2006.01)

(52) U.S. Cl.
CPC ...... *G06F 12/0833* (2013.01); *G06F 12/0895* (2013.01); *G06F 15/8023* (2013.01); *G06F 2212/507* (2013.01)

(56) References Cited

U.S. PATENT DOCUMENTS

| | | | |
|---|---|---|---|
| 7,315,919 | B1 | 1/2008 | O'Krafka et al. |
| 7,406,086 | B2 | 7/2008 | Deneroff et al. |
| 7,472,224 | B1 | 12/2008 | Klass et al. |
| 2010/0251005 | A1 | 9/2010 | Kitano |
| 2014/0052923 | A1 | 2/2014 | Ikeda |
| 2015/0067269 | A1 | 3/2015 | Wang et al. |
| 2016/0026472 | A1* | 1/2016 | Murphy ............ G11C 29/46 711/103 |
| 2016/0147658 | A1 | 5/2016 | Ambroladze et al. |
| 2018/0088862 | A1* | 3/2018 | Covington ........ G06F 3/0659 |
| 2018/0089127 | A1* | 3/2018 | Flajslik ............ G06F 13/4068 |
| 2018/0097743 | A1* | 4/2018 | Guim Bernat ........ H04L 12/185 |
| 2021/0034375 | A1* | 2/2021 | Maroni ............ H03K 19/17772 |

OTHER PUBLICATIONS

Kim et al: "Technology-Driven, Highly-Scalable Dragonfly Topology", 2013 21st International Conference on Program Comprehension (ICPC); [International Symposium on Computer 21 Architecture. (ISCA)], IEEE, US, Jun. 2008 (Jun. 21, 2008), pp. 77-88, XP031281669, ISSN: 1063-6897 ISBN: 978-0-7695-3174-8.

International Search Report issued by the European Patent Office acting as the International Searching Authority in relation to International Application No. PCT/NO2017/050266 dated Jan. 24, 2018 (4 pages).

Written Opinion of the International Searching Authority issued by the European Patent Office acting as the International Searching Authority in relation to International Application No. PCT/NO2017/050266 dated Jan. 24, 2018 (6 pages).

Norwegian Search Report issued by the Norwegian Industrial Property Office in relation to Norwegian Application No. 20161654 dated Apr. 26, 2017 (2 pages).

* cited by examiner

Local Memory Access, HT Probe for Shared Data

Remote Memory Access, Remote Cache Hit

Remote Memory Access, Remote Cache Miss 2D and 3D Torus Topology Options

Ex: 8 x 8 x 8 = 512 Nodes —> 1024 Sockets

PROGRAMMABLE CACHE COHERENT NODE CONTROLLER

CROSS-REFERENCE TO RELATED APPLICATIONS

This application is a national phase entry under 35 U.S.C. 371 of PCT International Application No. PCT/NO2017/050266 filed Oct. 16, 2017, which claims priority to Norwegian Application No. 20161654, filed Oct. 18, 2016, the disclosure of each of these applications is expressly incorporated herein by reference in their entirety.

TECHNICAL FIELD

The present invention relates to a multiprocessor memory sharing systems including node controllers. In a scalable shared memory system with multiple general purpose central processing units the present invention uses transaction engines to perform actions required to maintain system wide cache and memory coherency.

BACKGROUND ART

By cache coherence, it is meant consistency of shared data stored in multiple local caches. In a multi-processor system with multiple local caches, data that reside in these caches must be updated or invalidated such that accesses to the data will reflect the latest values stored by any given processor with access to that data. Processors operate independently of each other and thereby influence on the caches independently of each other and without cache coherence logic, shared data would not be valid and would cause inconsistent results for multithreaded programs that use the data.

Cache coherence is intended to manage and maintain consistency between the caches and memory.

Multiprocessor memory sharing systems has normally been carried out with hard-wired application specific integrated circuits (ASICs) using state machines that cannot be changed after the ASIC has been manufactured. This requires a very comprehensive verification program to be conducted before the ASIC is produced and leaves no room for correcting any potential errors in the state machines without making a new ASIC. This is both expensive and time consuming.

Modern processors have capabilities of interconnecting a relatively low number of processor modules to form larger systems by direct connections between the processors across point-to-point links. Each processor module contains a number of CPU cores. These links are not capable of expanding the system size beyond typically 4-8 modules, although some may go as far as a maximum of 16. For performance reasons, the directly connected systems are limited to 8 modules due to the increasing inefficiency in the protocols that handle housekeeping task to maintain data coherency across all memories and high speed caches in the system.

U.S. Pat. No. 7,406,086 B2 discloses a method and apparatus for parallel processing. One embodiment provides a multiprocessor computer system that includes a first and second node controller, a number of processors being connected to each node controllers, a memory connected to each controller, a first input/output system connected to the first node controller, and a communications network connected between the node controllers.

DISCLOSURE OF INVENTION

It is one object of the invention to provide a flexible Node Controller for multiple processor systems with memory sharing, which do not suffer from the problems indicated above, in particular the problems related to the tedious verification and testing necessary for node controllers in multi-processor systems. This and other objects are met by a computer system at least comprising a first group of CPU modules connected to at least one first Programmable ASIC Node Controller being configured to execute transactions directly or through a first interconnect switch to at least one second Programmable ASIC Node Controller connected to a second group of CPU modules running a single instance of an operating system. According to one aspect of the invention the system comprises a Programmable ASIC Node Controller routing mechanism to perform direct and indirect connection to other Programmable ASIC Node Controllers within the system. The routing mechanism can be a Programmable ASIC Node Controller internal programmable crossbar switch.

In one aspect of the invention, the Programmable ASIC Node Controllers can be connected in a torus topology, and in another aspect of the invention the Programmable ASIC Node Controllers can be connected in a Dragonfly topology.

In one aspect the Programmable ASIC Node Controllers are interconnected through a Ethernet switch, in another aspect the Programmable ASIC Node Controllers are interconnected through an Omnipath switch and in yet another aspect of the invention the Programmable ASIC Node Controllers are interconnected through an InfiniBand switch.

In yet another aspect of the invention the at least one first Programmable ASIC Node Controllers are connected to separate first memory modules, where the first memory modules contain information about the state of memory and cache locations.

In one aspect of the invention the at least one first Programmable ASIC Node Controller can be connected to separate first memory modules on a first side of the first interconnect switch to store cache lines that belong to a second memory in a second node on a second side of the first interconnect switch. In one aspect of the invention, the Programmable ASIC Node Controllers can utilize internal RAM to implement a partial sectored directory with a minimal memory line tag information to speed up necessary tag lookup.

In another aspect of the invention, the Programmable ASIC Node Controller may contain multiple instances of a protocol transaction processing engines that perform the necessary transactions on directories and tags to maintain the system with cache and memory coherency.

In yet an aspect of the invention the at least one first Programmable ASIC Node Controller can be configured to issue speculative cache line requests to a target responder before the state of the cache line is known to the at least one first Programmable ASIC Node Controller and where a transaction can be dropped if the cache line is valid at the requester, where the target responder can be a second node on a second side of the first interconnect switch.

In another aspect of the invention the at least first Programmable ASIC Node Controllers are co-located with associated CPU chips in a multi-chip package.

According to a second embodiment of the invention, it is provided a Node Controller for multiprocessor memory sharing systems, where the Node Controller is a Programmable ASIC Node Controller.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which.

DETAILED DESCRIPTION OF THE INVENTION

Figure 1:
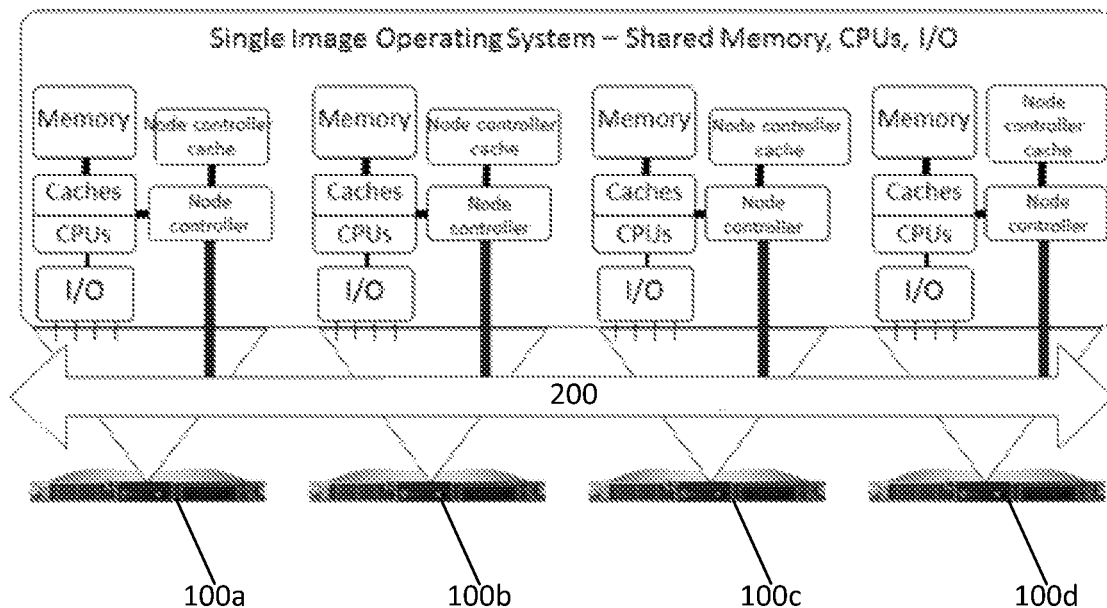
FIG. 1 shows an example of system architecture.

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

In the following description it will be adhered to the definitions below:

According to one aspect of the invention a Node Controller (NC) is connected to a server processor's coherent interface. The Node Controller manages information packets generated by CPUs and transferred by the coherent interface to the Node Controller to perform memory transactions in the form of read/write operations and other special transactions that are used to send management signals between the different memory and cache units in a computer system in order to keep the data contained in the memory and cache units coherent, i.e. any given entity in the memory system should reflect the latest update done by any processor in the system. Multiple such Node Controllers can be connected to each other across an interconnect fabric and set up to form a unified shared memory computer system.

Modern CPUs are equipped with coherent links to connect a small number, of CPUs into a larger shared memory system—a "Node". Larger systems will have to be built using special circuitry to connect "Nodes" together to form a larger shared memory system consisting of a number of such Nodes. A Node can typically contain from 1 to 4 CPUs and one or more Node Controllers.

According to the present invention the Node Controller is programmable at the time when the system is booted. This programmability enables correcting initial design errors in addition to allow for field upgrades and optimizations done at a later stage. It also reduces the risk of not having a workable product with the first version of the Node Controller silicon since design flaws can be corrected by the firmware that is loaded into the programmable protocol engines inside the chip at system boot time. The present invention combines a Programmable ASIC Node Controller capability with a specific type of functionality. The functionality can be described as a Node Controller in a scalable computer system with multiple central processing units (CPUs) where all the processors can share and operate on all the available memory and where all the caches and the corresponding memory locations in the system are kept coherent with respect to the valid data produced by the processors.

The present invention will now be described in detail with support from the drawings.

FIG. 1 shows a system architecture comprising four devices 100a, 100b, 100c, 100d, each device being a computer, a server or a blade server—above referred to as a node 100a, 100b, 100c, 100d. Each node 100a, 100b, 100c, 100d comprises at least one CPU where the at least one CPU includes or are associated with one or more local caches. The local caches are further connected to the local CPU memory. The at least one CPU of each node is also connected to a Node controller. Each node controller is provided with or associated with its own node controller cache. The node controller of a first node 100a is interconnected with the node controllers of a second 100b, a third 100c and a fourth 100d node. The interconnection can be carried out using different types of fabric connections 200 such as cross bar switches or any other suitable switch. In some aspects of the invention the interconnection 200 can be on-chip distributed switching over Ethernet, Omnipath or Infiniband.

The switching fabric can be 1D, 2D and 3D (Torus) this is not shown in the drawings and it will be explained below with reference to another figure. The node controllers provide cache coherency and memory coherency within the system in FIG. 1. Obviously, the system shown in FIG. 1 can be extended both with respect of the number of nodes and with respect to the components within each single node 100a, 100b, 100c, 100d.

Figure 2:
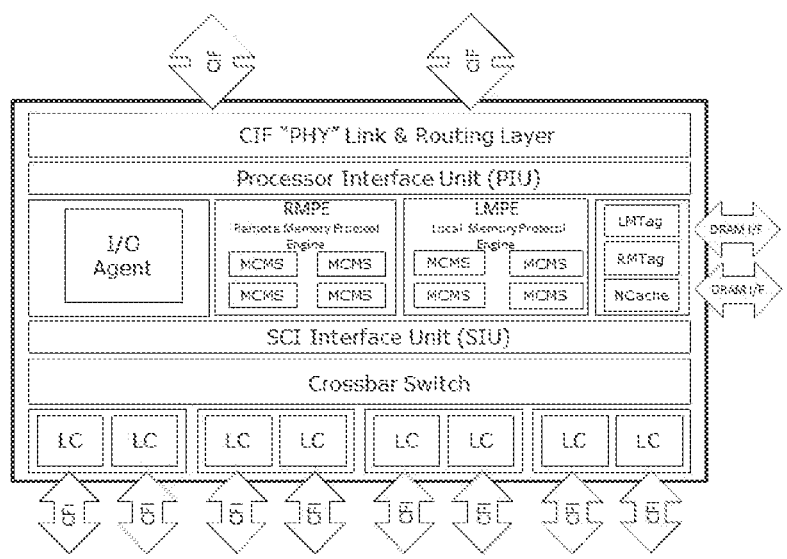
FIG. 2 shows a block diagram of a programmable ASIC node controller.

FIG. 2 shows a block diagram of a programmable ASIC-node controller. The node controller is provided with interfaces for communication with CPU's, memories, other node controllers etc. At the top of the figure two CIF, bidirectional Coherent interfaces are shown. The CIF connects the node controller with one or more CPU's within the same node. The at least one CIF communicates with the programmable ASIC-node controller through an on-chip "Coherent Interface "PHY" Link & Routing Layer". The routing layer is CPU-specific, and cannot be updated via firmware. A processor Interface Unit is also embedded in the programmable ASIC-node controller, the processor interface Unit translates the transactions specific to the particular CPU architecture into a global cache coherence protocol and transfers the transactions to cache coherence protocol engines. Communication with remote and local memories and caches requires that the requester, the programmable ASIC-node controller in question, speaks the same language as the receivers. Hence both a local Memory Protocol Engine LMPE and a Remote Memory Protocol Engine, RMPE, is included in the programmable ASIC-node controller. The LMPE and RMPE sets up the correct protocols to match data transfer between memories within a node as well as between nodes. Apart from the Routing layer (Coherent interface "PHY" Link & Routing Layer) the programmable ASIC-node controller can be configured for different CPUs by firmware downloading. The node controller includes on-chip fabrics shown as a crossbar switch. The crossbar switch links the node controller to other nodes in a system of nodes. The interface between the node controller and remote nodes is shown as eight Coherent Fabric Links (CFL) gates. The on chip crossbar switch routes traffic from the node controller to the correct CFL gate and further to the correct memory/cache. Link controllers, LC, are provided in between the CFL gates and the crossbar switch.

DRAM IF is shown as two bidirectional links on the right side of the block diagram of FIG. 2. There is at least one DRAM IF providing interface between the programmable ASIC-node controller and its associated node controller directory tag and/or cache. Three boxes are indicated next to the DRAM IF gates, namely LMTag, RMTag and NCache. The NCache is an on-chip cache for caching remote data to be used by local processors as shown in FIG. 10. This cache keeps the most recently used data residing in the off-chip cache located in one of the external DRAM modules. The NCache in FIG. 2 corresponds with the Node Controller Cache shown in FIG. 1 and in FIGS. 6-11.

The programmable ASIC-node controller further includes an I/O Agent visualised as a box to the left in FIG. 2. The I/O agent handles input and output of non-coherent memory transactions issued by the processors and other housekeeping tasks for accessing control registers and status registers that can be operated upon by the operating system or a separate system maintenance processor. The status registers keep information from error counters and error correcting circuits that are included to provide data consistency in case of soft errors in data-paths, interconnect fabric links and processor links.

LMPE is the Local Memory Protocol Engine. The LMPE is a programmable engine specifically designed to handle memory transactions through executing microcode firmware. The firmware is specific to the particular processor architecture's cache coherence protocol. It handles all memory transactions that are directed from an external processor to the memory connected to the processors local to the Node Controller. RMPE is the Remote Memory Protocol Engine. The RMPE handles the memory transactions that are destined to operate on memory connected with processors that are located on the other side of the Coherent Interface Fabric. The RMPE is also controlled by microcode firmware and programmed to be compliant with the cache coherence protocol of the particular processor architecture.

MCMS is the Multi Context Micro Sequencer and can be present as a number of separate instances depending on the amount of outstanding memory transactions that is necessary to satisfy the performance requirements for a particular implementation. The MCMS handles the sequencing of the microinstructions in the microcode firmware. LMTag is the Local Memory directory tag. The LMTag encodes the state of the memory lines of the processors local to the Node Controller. The memory lines are equal in size to the granularity for the particular processor architecture. Most modern processor architectures use 64 bytes as the granularity of the objects that are contained in the processor cache memories.

RMTag is the Remote Memory directory Tag, The RMTag, encodes the state of the cache lines contained in the NCache and also contains pointers is some form to identify the address of the Node Controller on the remote node where the corresponding memory addresses are located.

NCache is the NumaCache. The NCache holds the most recently used memory lines from the processors associated with the remote Node Controllers.

Figure 3:
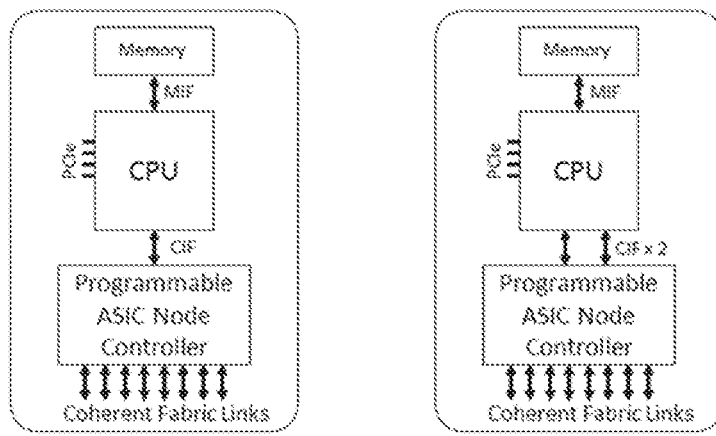
FIG. 3 shows two first examples of Programmable ASIC Node Controllers in communication with CPUs and coherent fabric links.
Figure 4:
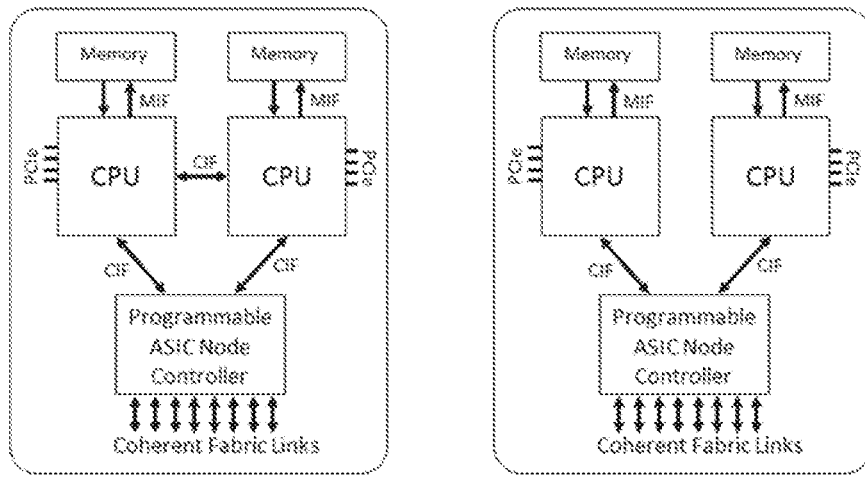
FIG. 4 shows two second examples of Programmable ASIC Node Controllers in communication with CPUs and coherent fabric links.

The programmable ASIC-node-controller with two different node options are shown in FIG. 3 and FIG. 4, the first option in FIG. 3 and the second in FIG. 4. FIG. 3 shows two simplified nodes each node includes at least one CPU, one programmable ASIC-node-controller, and one Memory associated with the CPU. Details are not included and the programmable ASIC-node-controller can include its own cache-memory. From the programmable ASIC-node-controller it is shown eight Coherent Fabric Links (CFL). These coherent fabric links corresponds with the CFL described with reference to FIG. 2. The interface between the programmable ASIC-node-controller and the CPU is shown as one coherent interface, CIF, on the left side and two coherent interfaces on the right node in FIG. 3. Peripheral Interconnect Express, PCIe, is shown as the interface between the CPU's and components outside of the node. Other bus standards for connecting peripherals might be used. A dedicated memory interface is provided between the CPU and the local memory within the node. The difference between the right hand side node and the left hand side node of FIG. 3 is as mentioned that the right hand side is provided with two coherent interfaces between the CPU and the programmable ASIC-node-controller.

FIG. 4 shows the second node option the second option is a scaled up version of the first option, as this second option shows nodes with two CPU's each. This is shown as an example as the system according to the present invention scales well and the number of CPU's can far exceed two. It can be seen that a single programmable ASIC-node controller handles two CPU's over a bidirectional coherent interface link. The same applies between the two CPU's, whilst the interface between the individual CPU's associated memory is provided as two bidirectional memory interfaces. As for FIG. 4 the interface between the CPU's and external components is exemplified as Peripheral Component Interconnect-express as was also the case in FIG. 3.

Figure 5:
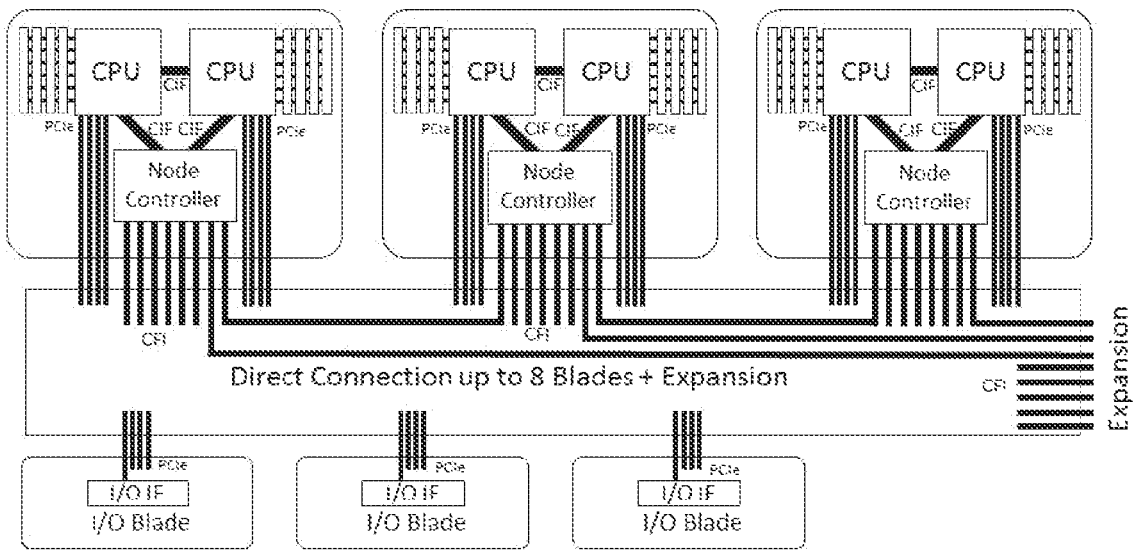
FIG. 5 shows a system example including Node Controllers, CPU's and I/O peripherals.

FIG. 5 shows an example of three nodes in a system, however many more nodes can be included in a system according to the present invention. In this example each node is provided with two CPU's which corresponds to the configuration shown in FIG. 4. Each node is connected directly to 7 other nodes through printed circuit board backplanes or cables, hence the programmable ASIC-node-controller in one node can communicate over a coherent fabric link, CFL, with a programmable ASIC-node-controller in any neighbouring node of the system. The system example of FIG. 5 indicates a system, which can include 8 blades plus expansion ports to connect to same expansion ports in other crates to expand the system size. The eight blades correspond with seven coherent fabric links indicated for each programmable ASIC-node-controller. Each programmable ASIC-node-controller within each node is connected with two CPU's over a coherent interface. It can be seen that the CPUs are interconnected over a coherent interface; also, the CPU's are connected with peripherals over PCIe as was also the case in FIGS. 3 and 4.

FIGS. 6-11 show transaction examples where CPU requests data from memory or cache locations internally in a node controller system comprising more than one node. When CPUs execute commands they need to fetch data in memories, freshly used data is stored in the local cache memory L1 of the CPU in question, less frequently used data can be stored in a second or third level of CPU-internal cache denoted L2 and L3 in the figures.

To keep memory coherency in a multiprocessor system, data at all locations must be updated according to use. If there is not memory coherency within a multiprocessor system, processors might read outdated, i.e. erroneous data, which obviously can be fatal. That means if a first processor writes data into a particular address in main memory, and a second processor at a different node accesses that particular address it will not read data as expected in accordance with own previous instructions, but data written by the first processor, etc. FIG. 6-11 shows how this type of coherency problems is handled.

Figure 6:
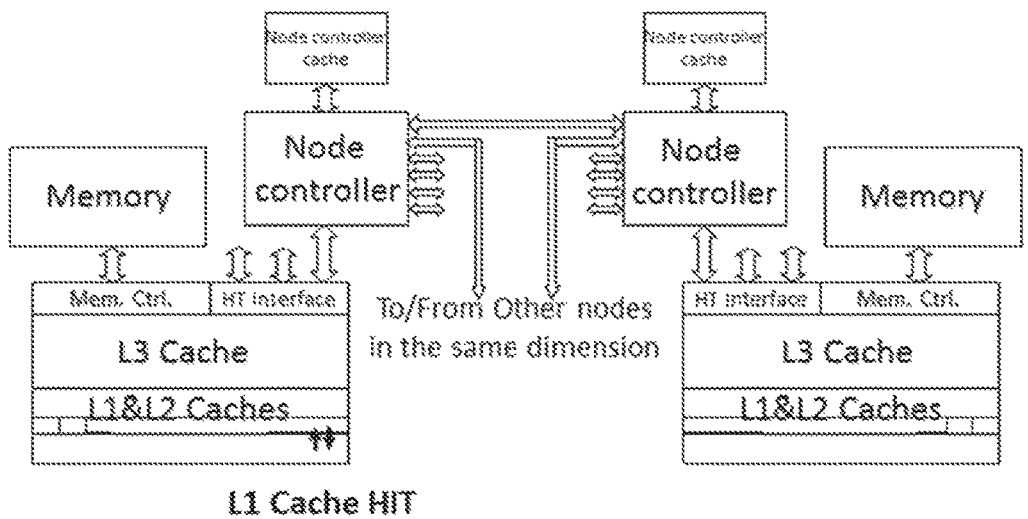
FIG. 6 shows a principal operation where a CPU has a hit in local L1 cache.

FIG. 6 shows an example where a first processor access data from a local internal cache, L1. As is shown in the figure by arrows it is sufficient to access data directly from the nearest cache L1. In practice, the first processor during execution of instructions get a memory location match for reading data which is locally stored in L1. Bearing in mind that L1 is of restricted size thus only a limited amount of fresh data can be stored at this location. A write instruction will follow the same pattern, however a write instruction will overwrite data in the L1. The overwritten data may have its copy/mirror data in a remote memory or a local memory. The node controller keeps track of memory updates in case data is shared with any other processor.

Figure 7:
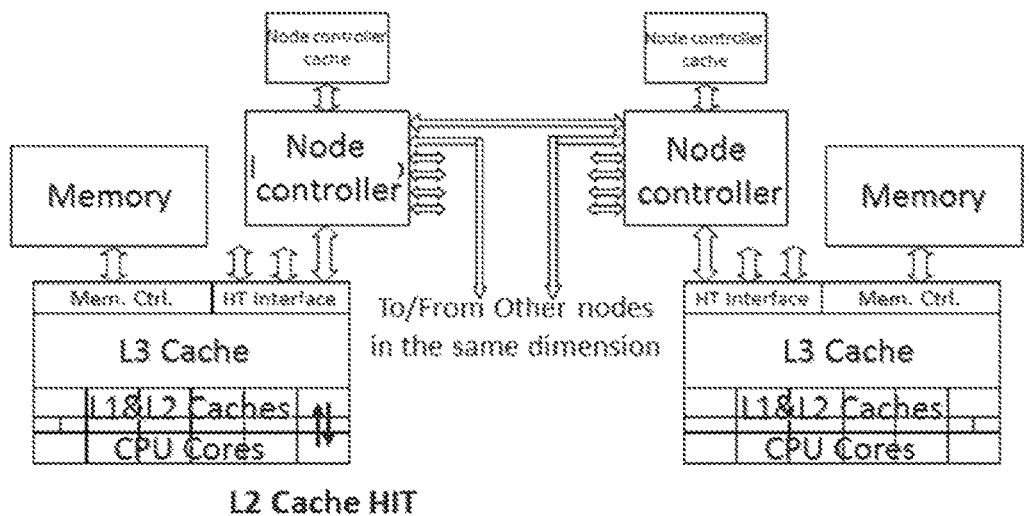
FIG. 7 shows a principal operation where a CPU has a hit in local L2 cache.

FIG. 7 shows a similar situation as described with reference to FIG. 6, however in this example the relevant data to read is in the L2 cache, that is at a second level "for not so frequently used" data as for L1. If the instruction is a write instruction the same applies, but the data will be written to L1 and the copy in L2 will be invalidated. If there is no other processor sharing the cache line, the only valid copy will now reside in this L1 cache.

Figure 8:
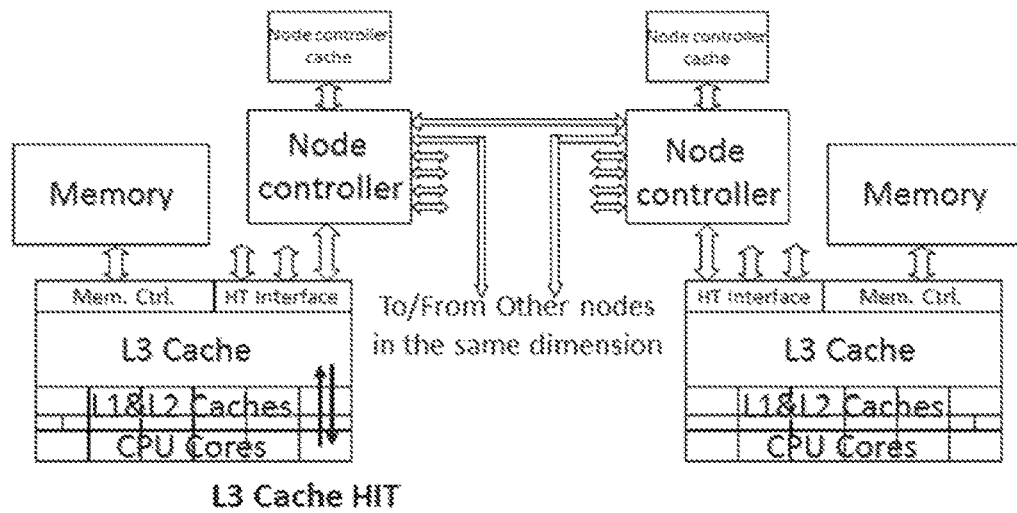
FIG. 8 shows a principal operation where a CPU has a hit in local L3 cache.

FIG. 8 shows an example pretty much the same as with respect to what was described with support in FIGS. 6 and 7 above. Note that, normally the higher the level of cache has more capacity and longer access time.

The examples above with reference to FIGS. 6-8 where processor internal caches are accessed are examples where the node controller does not have to keep track of changes; these are strictly processor internal actions as far as the cache line is not shared with any other processor in the system.

Figure 9:
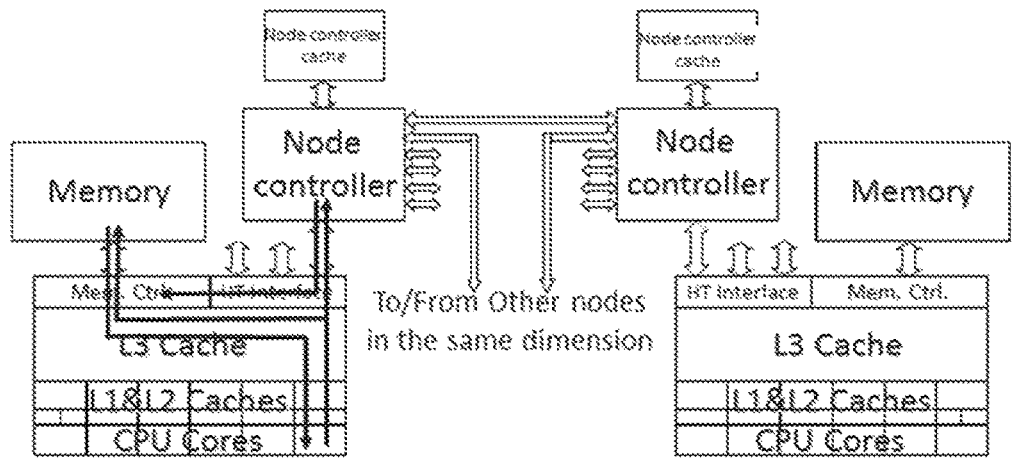
FIG. 9 shows a principal operation where a CPU accesses local memory and where the closest associated Node Controller provides cache coherence.
Figure 10:
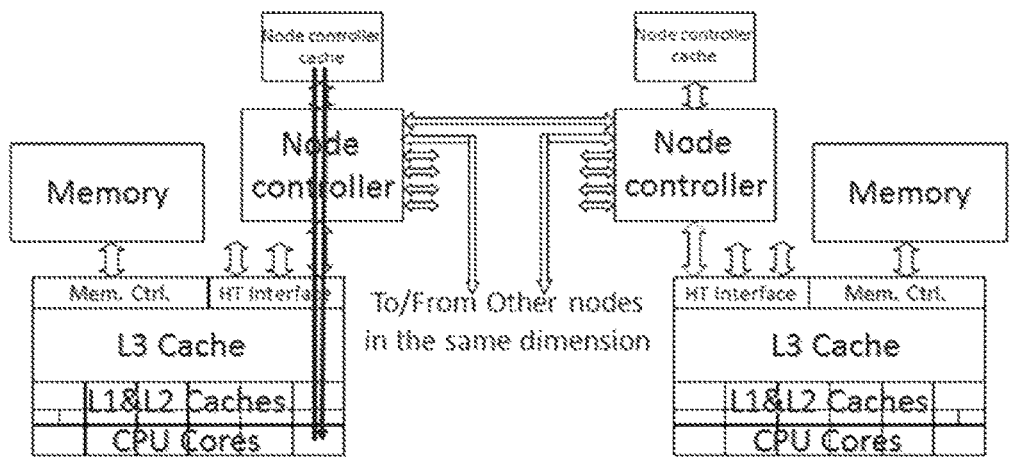
FIG. 10 shows a principal operation where a CPU has a hit in the node controller's cache.

FIG. 9 shows a different scenario, in this example the processor reads data from its local memory—as expected this implies actions by the programmable ASIC node controller. In this example data to be accessed is in the memory within the same node and not in the local cache. The operation will result in data being read from the local memory and transferred to the destination register of the processor and copied to the L1 cache of the processor. In a multiprocessor system with multiple memories associated with different nodes this transaction must be checked against potential copies of the data in the caches of the other nodes in the system. The memory controller of the requesting processor will issue a snoop operation that is broadcasted to all other processors on the local node and to the node controller. The node controller represents all the other nodes in the system and if any one of these external processors have a copy, the node controller will notify these processors if the operation performed alters the data in the cache line by issuing an invalidate or update operation. A write instruction originating from the first processor accesses the local memory while the same write instruction simultaneously accesses the local node controller. The local node controller will then update information regarding the content of the particular address accessed and written to in the local memory. Thereby the local node controller will ensure coherency of the memory. As long as the cache line is not shared with any processor belonging to any of the other nodes in the system, this transaction will not result in any update or invalidate action by the node controller. However as soon as memory sharing between nodes is relevant, this invalidating or updating is crucial for maintaining memory coherency. The programmable ASIC-node controller transfers information regarding the update to the external node controllers which in turn performs the necessary local actions to invalidate or update the respective local processor caches. The arrows in FIG. 9 indicates the actions involved when a processor accesses data in its local memory.

FIG. 10 shows an example where the address of the accessed data is in a remote memory, that is outside of the originating node and where there is no longer any valid copy in any of the processor caches, but a valid copy still exists in the cache of the node controller. The arrows indicate the request address and the data response paths.

Figure 11:
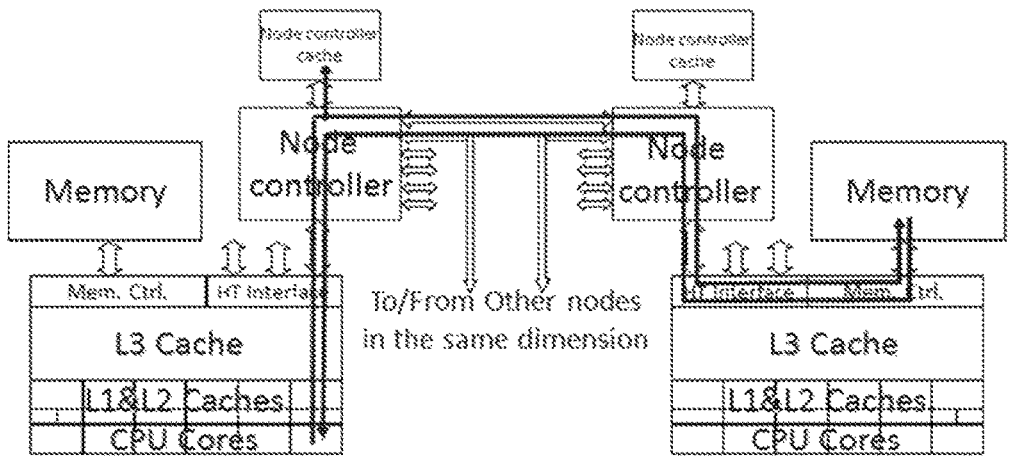
FIG. 11 shows remote memory access from a CPU where the associated Node Controller's cache is updated.

FIG. 11 shows an example of a remote memory access which misses in all caches. The originating processor being the same as in the examples discussed above with reference to the FIGS. 6-10. In this example the data is located at an address associated with a remotely located processor. The cache line is returned from the memory controller of the remote processor and placed in the requesting processors destination register and copied into that processors L1 cache and to the remote cache connected to the requesting node's node controller.

All the examples described above are in the simplest form where no cache line replacement transactions have to be issued. In case there are valid data belonging to another address that are located modulo cache size away, the cache coherence firmware will manage this by writing the valid cache line back to the home memory before replacing the line by storing the new contents in the cache.

Network Topologies

Figure 12:
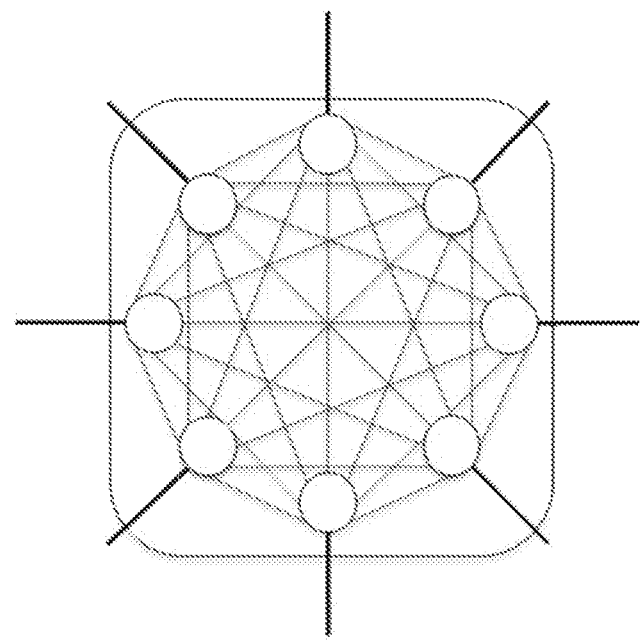
FIG. 12 shows a single chassis blade system comprising eight nodes fully interconnected in a one-hop configuration.

FIG. 12 shows a single chassis system comprising eight nodes fully interconnected in a one-hop configuration. As can be seen all nodes can access each other without any intermediate hops. The nodes are visualised as circles which are interconnected with "solid" lines.

Figure 13:
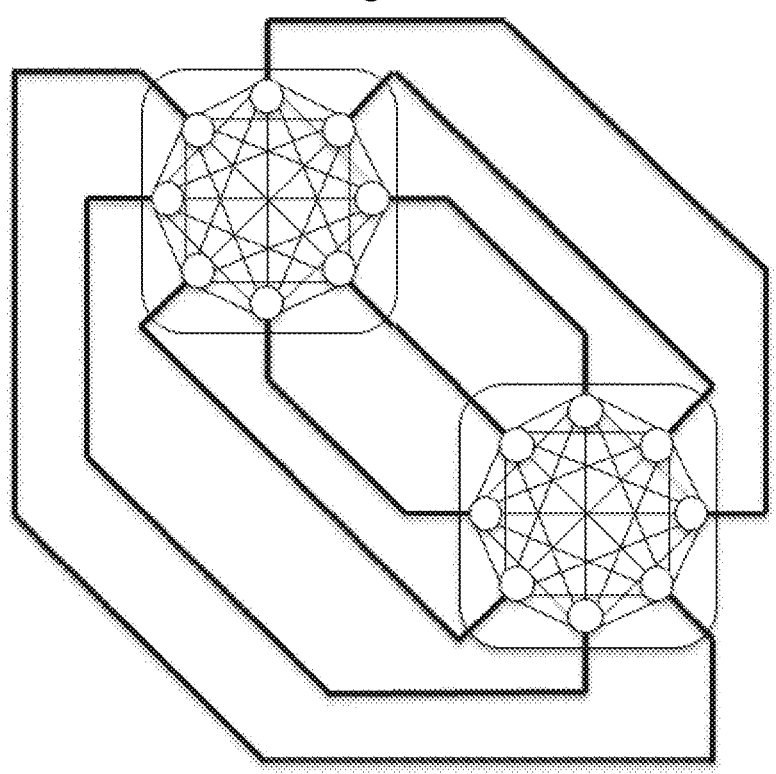
FIG. 13 shows a dual chassis blade system comprising 16 nodes in a Dragonfly topology with redundant paths.

FIG. 13 shows a dual chassis system comprising 16 nodes in a Dragonfly topology with redundant paths. This topology doubles the capacity of the single chassis system in FIG. 12 at the price of introducing one intermediate hop for some connections between nodes.

Figure 14:
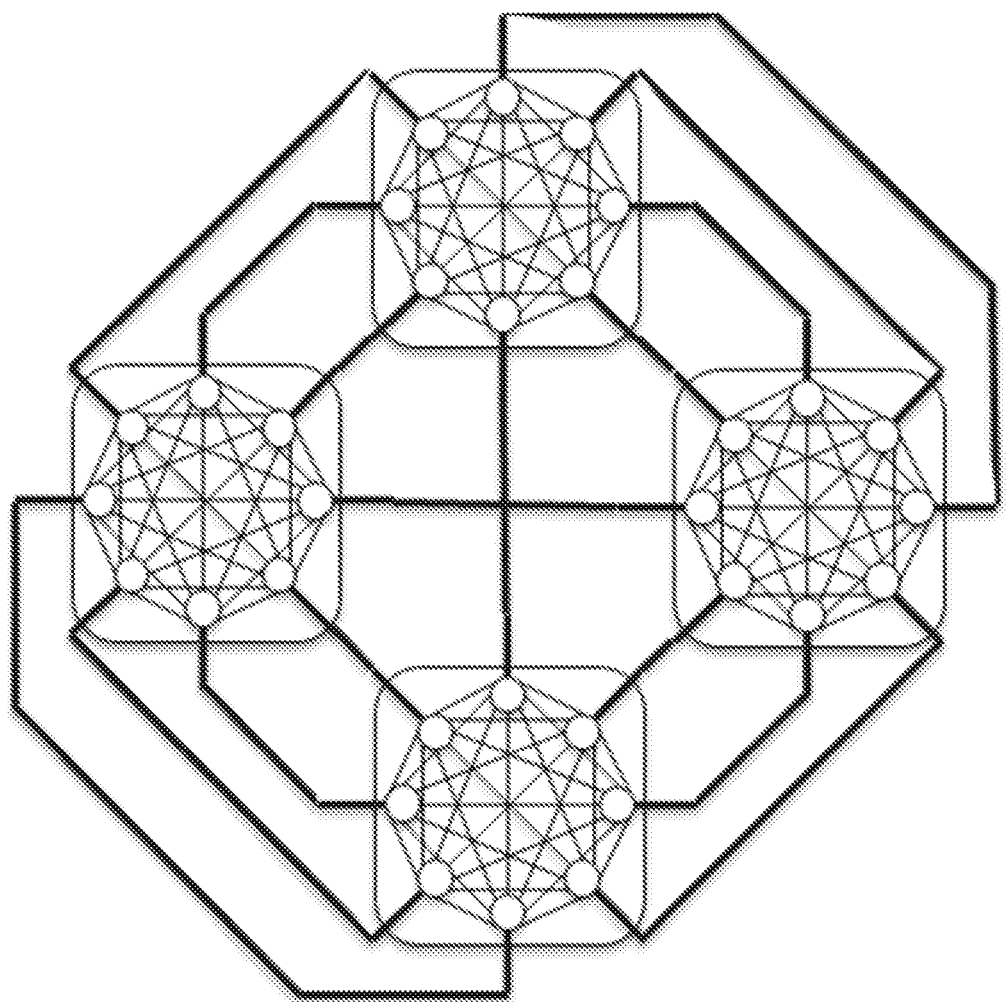
FIG. 14 shows a quad chassis blade system comprising 32 nodes in a Dragonfly topology with redundant paths.

FIG. 14 shows a quad chassis system comprising 32 nodes in a Dragonfly topology with redundant paths. This topology doubles the capacity i.e. the number of nodes compared with the dual chassis blade system. The prize to pay for doubling the capacity is that a maximum of two intermediate hops are introduced, obviously introducing more hops introduces delays in the system Still the topology is a good trade-off between capacity and delays.

Figure 15:
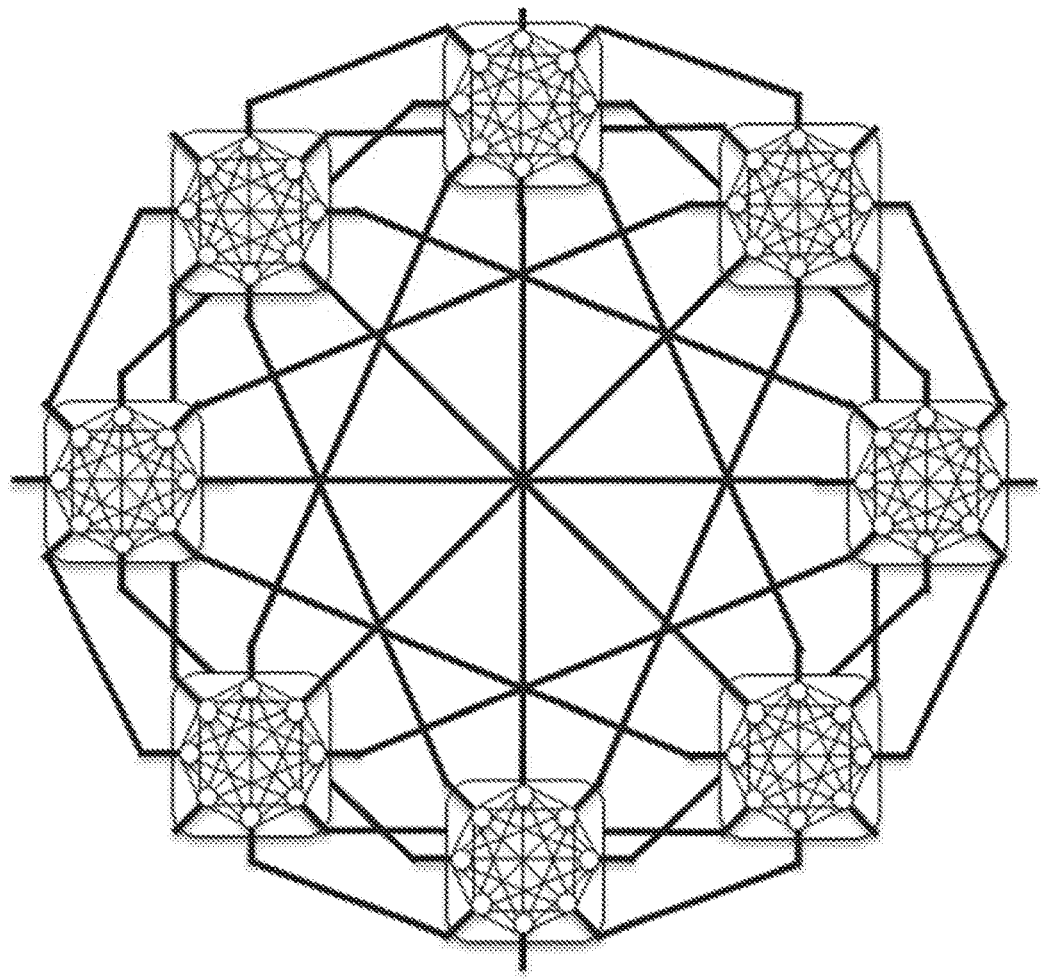
FIG. 15 shows an eight chassis blade system comprising 64 nodes in a Dragonfly topology with redundant paths.

Finally, in FIG. 15 it is disclosed an eight chassis system comprising 64 nodes in a Dragonfly topology with redundant paths.

Dragonfly topologies introduce redundant paths, which is an advantage for reliability and congestion scenarios.

Firstly, some general principles regarding network topology will be described. Different network topologies can be applied for a multiprocessor system with memory coherency. The table routed on-chip crossbar used in the present description allows for a multitude of different topologies in addition to the previously described direct connected and dragonfly topologies without the use of external switching. The most relevant additional topologies to use are 1D, 2D and 3D Torus topologies. A one dimensional system means that nodes are interconnected a long one single path (ring), whilst two dimensional switching means that nodes can be interconnected in a matrix. Travelling path from nodes at the top of the matrix to the bottom of the matrix then involves several hops. If this matrix is "folded together" such that the "lowermost" nodes becomes the neighbours of the "uppermost" nodes the number of hops is reduced, in fact in the described situation no hop will be necessary. This configuration can be visualised as a "tube". This solution however does not solve the problems regarding paths in the direction normal to the path from "upper to lower" nodes. By bending the "tube" into a "donut" the number of hops in all directions will statistically be fewer.

Figure 16:
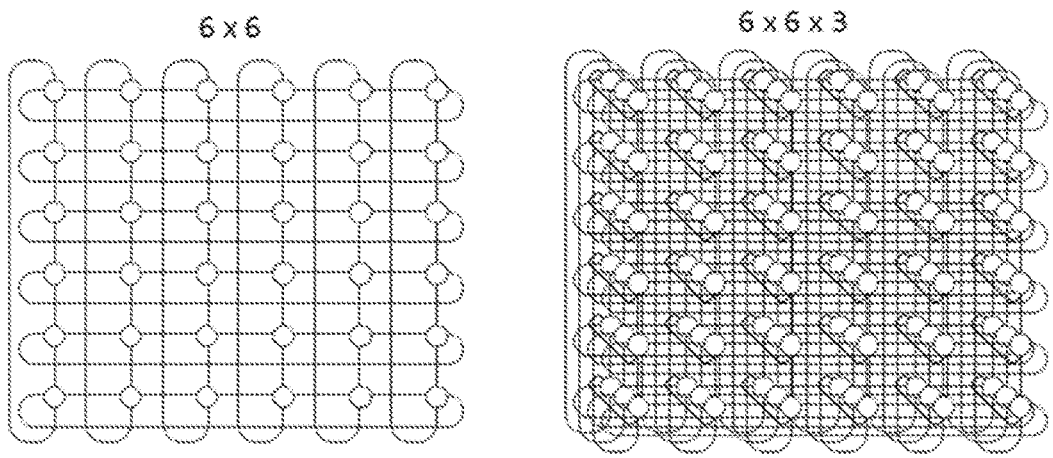
FIG. 16 shows a 2D Torus topology on the left hand and a 3D Torus topology on the right hand side.

FIG. 16 shows schematic examples of a matrix topology with 6×6 nodes to the left. The topology resembles a "double folded matrix" as the bottom and top nodes are interconnected this alone resembles the tube example above, additionally the left most nodes are connected with the right most nodes making a "double folded matrix or a donut. The figure to the right shows a 3D expanded version of the left matrix, with three layers interconnected resulting in a 6×6×3 network. Such a 3D topology scales well and an 8×8×8 network topology is indicated by text at the bottom of FIG. 16, such a topology would result in 512 nodes and altogether 1024 CPU sockets with 2 CPU sockets per node.

| | |
|---|---|
| 100a, 100b, 100c, 100d | A computer, a server or a blade server - above referred to as a node |
| 200 | On-chip distributed switching, such as but not limited to. Ethernet swatch, Omnipath swatch and Infiniband switch, |
| ASIC | Application Specific Integrated Circuits |
| CFL | Coherent Fabric Link |
| CIF | Coherent Interface |
| CSR | Control Space Registers |
| HT | Hyper Transport |
| LC | Link Controller |
| LM-Tag | Local Memory Tag |
| LMPE | Local Memory Protocol Engine |
| MCMS | Multi Context Micro Sequencer |
| MIF | Memory Interface |
| MMIO | Memory Mapped IO |
| NC | Node Controller |
| NCache | NumaCache (Non-uniform memory access Cache) |
| NUMA | Non-uniform memory access |
| PCI-e | PCI Express (Peripheral Component Interconnect Express |
| RM-Tag | Remote Memory Tag |
| RMPE | Remote Memory Protocol Engine |
| SCI | Scalable Coherent Interface |
| UPI | Ultra Path Interconnect |

The invention claimed is:

1. A computer system comprising a first group of CPU modules operatively coupled to at least one first Programmable ASIC Node Controller configured to execute transactions directly or through a first interconnect switch to at least one second Programmable ASIC Node Controller connected to a second group of CPU modules running a single instance of an operating system, wherein the at least one first Programmable ASIC Node Controller comprises an on-chip cache and is configured to be programmable when the computer system is booting.

2. The computer system according to claim 1, further comprising a Programmable ASIC Node Controller routing mechanism to perform direct and indirect connection to other Programmable ASIC Node Controllers within the computer system.

3. The computer system according to claim 2, wherein the routing mechanism is an on chip programmable crossbar switch on the at least one first Programmable ASIC Node Controller.

4. The computer system according to claim 1, wherein the at least one first Programmable ASIC Node Controller is operatively coupled to the at least one second Programmable ASIC Node Controller in a torus topology.

5. The computer system according to claim 1, wherein the at least one first Programmable ASIC Node Controller is operatively coupled to the at least one second Programmable ASIC Node Controller in a Dragonfly topology.

6. The computer system according to claim 1, wherein the Programmable ASIC Node Controllers are operatively interconnected through an Ethernet switch.

7. The computer system according to claim 1, wherein the Programmable ASIC Node Controllers are operatively interconnected through an Omnipathswitch.

8. The computer system according to claim 1, wherein the Programmable ASIC Node Controllers are operatively interconnected through an InfiniBand switch.

9. The computer system according to claim 1, wherein the at least one first Programmable ASIC Node Controller is operatively coupled to separate first memory modules, where the first memory modules contain information about the state of memory and cache locations.

10. The computer system according to claim 1, wherein the at least one first Programmable ASIC Node Controller is operatively coupled to separate first memory modules on a first side of the first interconnect switch to store cache lines that belong to a second memory in a second node on a second side of the first interconnect switch.

11. The computer system according to claim 1, wherein the Programmable ASIC Node Controllers utilizes internal RAM to implement a partial sectored directory with a minimal memory line tag information to speed up necessary tag lookup.

12. The computer system according to claim 1, wherein the Programmable ASIC Node Controllers comprises multiple instances of a protocol transaction processing engines that perform the necessary transactions on directories and tags to maintain the system with cache and memory coherency.

13. The computer system according to claim 1, wherein the at least one first Programmable ASIC Node Controller is configured to issue speculative cache line requests to a target responder before the state of the cache line is known to the at least one first Programmable ASIC Node Controller and where a transaction can be dropped if the cache line is valid at the requester.

14. The computer system according to claim 13, wherein the target responder is a second node on a second side of the first interconnect switch.

15. The computer system according to claim 1, wherein at least first Programmable ASIC Node Controllers are co-located with associated CPU chips in a multi-chip package.

16. A Node Controller for multiprocessor memory sharing systems, wherein the Node Controller comprises:
a Programmable ASIC Node Controller, wherein:

the Programmable ASIC Node controller comprises an on-chip cache;

the Programmable ASIC Node controller is configured to be programmable during booting; and the Programmable ASIC Node controller is provided with interfaces for communication with CPU's, memories, and other node controllers, the interfaces including at least two CIF, bidirectional Coherent Interfaces, wherein at least one of the CIF, bidirectional Coherent Interfaces is configured to connect the node controller with at least one CPU within the same node.

17. A node controller according to claim 16, wherein the Programmable ASIC Node Controller comprises a Remote Memory directory Tag (RMTag), the RMTag encodes the state of the cache lines contained in the on-chip cache and also contains pointers to identify the address of the Node Controller on a remote node where the corresponding memory addresses are located.

* * * * *